(12) United States Patent
Lee et al.

(10) Patent No.: US 11,076,442 B2
(45) Date of Patent: Jul. 27, 2021

(54) METHOD AND APPARATUS FOR CONTROLLING SRB

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/333,418

(22) PCT Filed: Sep. 25, 2017

(86) PCT No.: PCT/KR2017/010535
§ 371 (c)(1),
(2) Date: Mar. 14, 2019

(87) PCT Pub. No.: WO2018/062786
PCT Pub. Date: Apr. 5, 2018

(65) Prior Publication Data
US 2019/0254101 A1  Aug. 15, 2019

Related U.S. Application Data

(60) Provisional application No. 62/401,144, filed on Sep. 28, 2016.

(30) Foreign Application Priority Data

Aug. 21, 2017 (KR) .................. 10-2017-0105220

(51) Int. Cl.
| | | |
|---|---|---|
| *H04W 76/19* | (2018.01) | |
| *H04W 76/15* | (2018.01) | |
| *H04W 24/08* | (2009.01) | |

(52) U.S. Cl.
CPC .......... *H04W 76/19* (2018.02); *H04W 76/15* (2018.02); *H04W 24/08* (2013.01)

(58) Field of Classification Search
None
See application file for complete search history.

(56) References Cited

U.S. PATENT DOCUMENTS

| | | |
|---|---|---|
| 9,113,450 B2 | 8/2015 | Pelletier et al. |
| 2012/0135736 A1* | 5/2012 | Sebire ............... H04W 36/0055 455/436 |

(Continued)

FOREIGN PATENT DOCUMENTS

WO   WO 2016/003224 A1   1/2016

*Primary Examiner* — Walter J Divito
(74) *Attorney, Agent, or Firm* — Birch, Stewart, Kolasch & Birch, LLP

(57) ABSTRACT

Provided are a method for a terminal controlling a signaling radio bearer (SRB) in a wireless communication system and an apparatus supporting same. The method comprises the steps of: establishing a radio resource control (RRC) connection with a first base station and setting a first SRB; setting a second base station and a second SRB, wherein the second SRB is temporarily suspended; and resuming the temporarily suspended second SRB when the quality of a cell in the first base station is worse than a first critical value.

11 Claims, 13 Drawing Sheets

(56) References Cited

U.S. PATENT DOCUMENTS

| | | | |
|---|---|---|---|
| 2015/0117183 A1* | 4/2015 | Heo | H04W 8/183 370/228 |
| 2016/0021649 A1* | 1/2016 | Zisimopoulos | H04W 64/003 370/329 |
| 2016/0135103 A1 | 5/2016 | Lee et al. | |
| 2016/0183151 A1 | 6/2016 | Wu | |
| 2019/0059031 A1* | 2/2019 | Hahn | H04W 36/30 |

* cited by examiner

METHOD AND APPARATUS FOR CONTROLLING SRB

CROSS REFERENCE TO RELATED APPLICATIONS

This application is the National Phase of PCT International Application No. PCT/KR2017/010535, filed on Sep. 25, 2017, which claims priority under 35 U.S.C. 119(e) to U.S. Provisional Application No. 62/401,144, filed on Sep. 28, 2016 and under 35 U.S.C. 119(a) to Patent Application No. 10-2017-0105220, filed in the Republic of Korea on Aug. 21, 2017, all of which are hereby expressly incorporated by reference into the present application.

BACKGROUND OF THE INVENTION

Field of the Invention

The present invention relates to a wireless communication system, and more particularly, to a method in which a terminal controls a signaling radio bearer (SRB), and an apparatus supporting the method.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

A user equipment (UE) persistently performs a measurement in order to maintain quality of a radio link with a serving cell which receives a service. The UE determines whether communication is impossible due to quality deterioration of the radio link with the serving cell. If the quality of the serving cell is significantly low and thus the communication is almost impossible, the UE determines a current situation as a radio link failure (RLF). Upon determining the RLF, the UE abandons maintaining of the communication with the current serving cell, selects a new cell through a cell selection (or cell reselection) procedure, and attempts RRC connection re-establishment to the new cell.

SUMMARY OF THE INVENTION

Meanwhile, generally speaking, reliability of an RRC connection is important. It is because if a connection failure occurs, not only a user equipment (UE) but also an eNodeB (eNB) cannot use a data radio bearer (DRB), and thus data transmission is not possible. For example, the UE cannot perform data transmission/reception during an RRC connection reestablishment procedure is performed. Accordingly, to ensure the reliability of the RRC connection, there is a need to propose a method in which the UE controls a signaling radio bearer (SRB) and an apparatus supporting the method.

According to an embodiment, there is provided a method in which a terminal controls a signaling radio bearer in a wireless communication system. The method may include: configuring a radio resource control (RRC) connection and a first SRB with a first base station; configuring a second SRB with a second base station, wherein the second SRB is in a suspended state; and resuming the suspended second SRB when quality of a cell at the first base station is worse than a first threshold.

The method may further include suspending the first SRB.

The method may further include resuming the suspended second SRB when quality of a cell at the second base station is better than a second threshold.

The method may further include resuming the suspended second SRB when a timer related to a radio link failure or a handover failure starts.

The method may further include resuming the suspended second SRB when an RRC connection re-establishment is initiated.

The method may further include resuming the suspended second SRB when the terminal determines to suspend the first SRB.

The second SRB may be a temporary SRB.

The first base station may be a base station where an RRC entity for the terminal is located, and the second base station may be a base station where the RRC entity for the terminal is not located.

According to another embodiment, there is provided a method in which a terminal controls an SRB in a wireless communication system. The method may include: configuring an RRC connection and a first SRB with a first base station, wherein the first SRB is in a suspended state; configuring a second SRB with a second base station; and resuming the suspended first SRB when quality of a cell at the first base station is better than a first threshold.

The method may further include suspending the second SRB.

The method may further include resuming the suspended first SRB when quality of a cell at the second base station is worse than a second threshold.

The method may further include resuming the suspended first SRB when a timer related to a radio link failure or a handover failure stops.

The method may further include resuming the suspended first SRB when the terminal determines to suspend the second SRB.

The first base station may be a base station where an RRC entity for the terminal is located, and the second base station may be a base station where the RRC entity for the terminal is not located.

According to another embodiment, there is provided a terminal for controlling an SRB in a wireless communication system. The terminal may include: a memory; a transceiver; and a processor operatively coupling the memory and the transceiver. The processor may be configured to: configure an RRC connection and a first SRB with a first base station; configure a second SRB with a second base station, wherein the second SRB is in a suspended state; and resume the suspended second SRB when quality of a cell at the first base station is worse than a first threshold.

Reliability of a radio resource control (RRC) connection can be improved.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
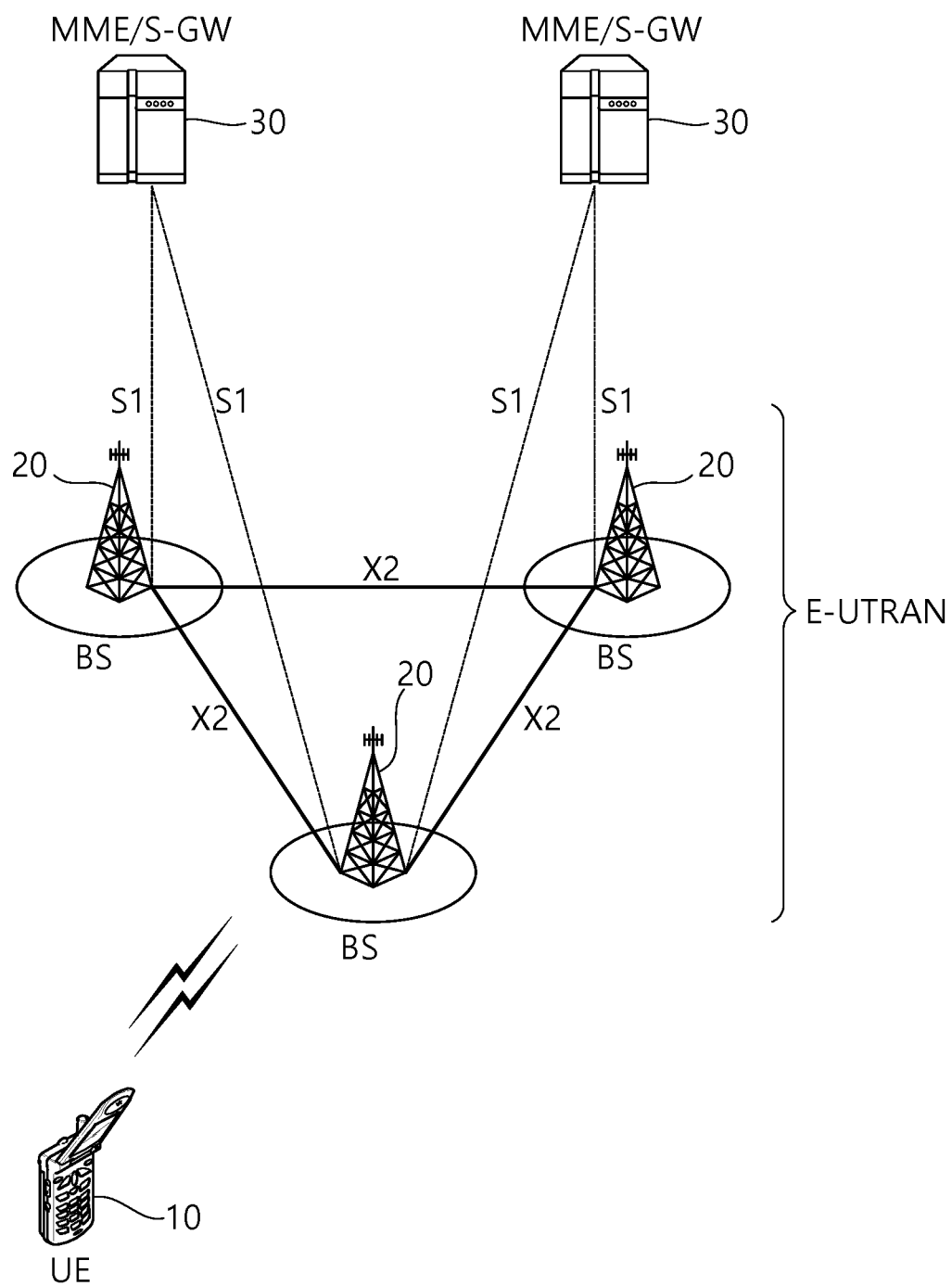
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
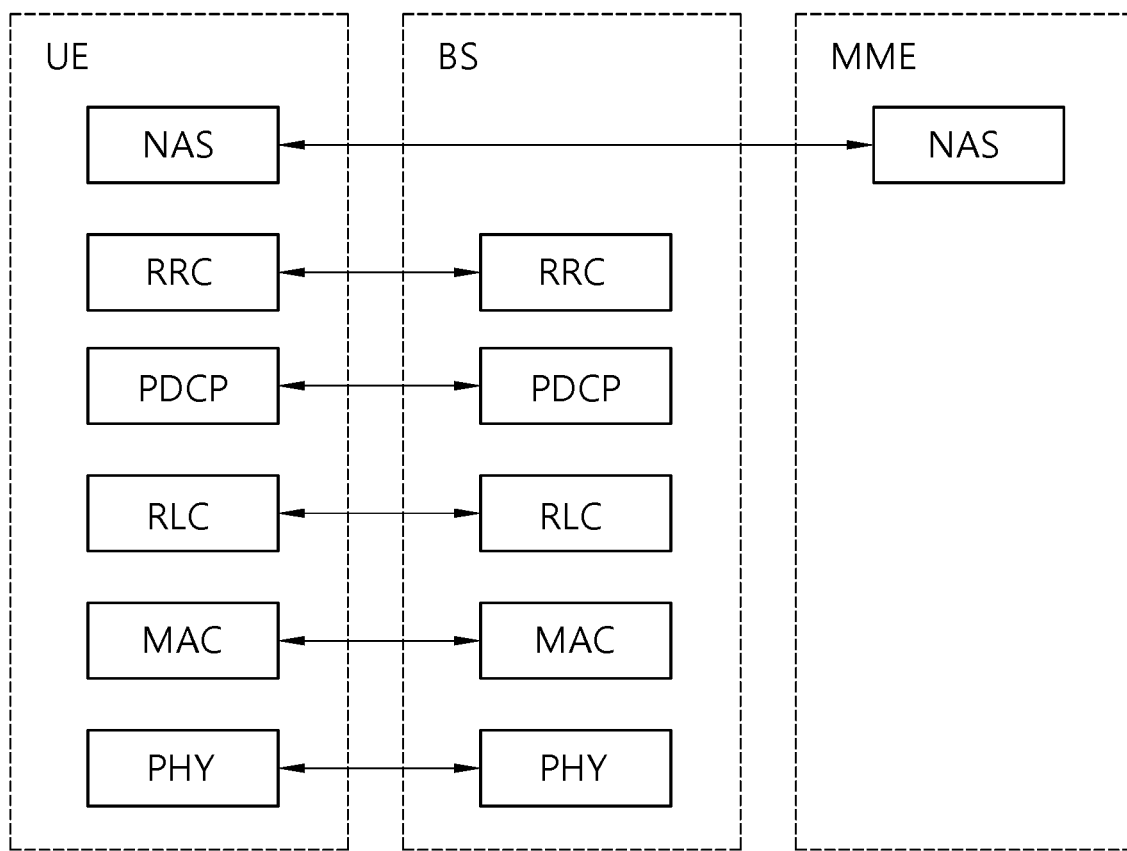
FIG. 2 shows a control plane of a radio interface protocol of an LTE system.
Figure 3:
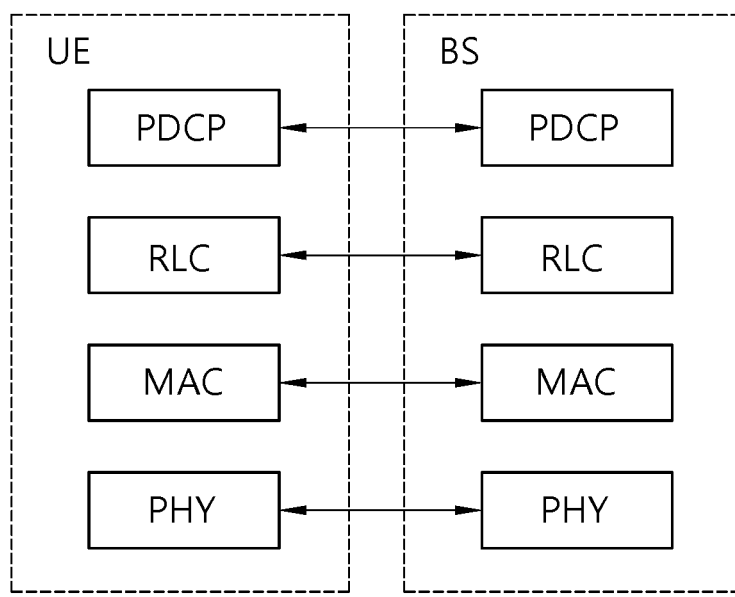
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belonging to an upper layer of the RRC layer serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
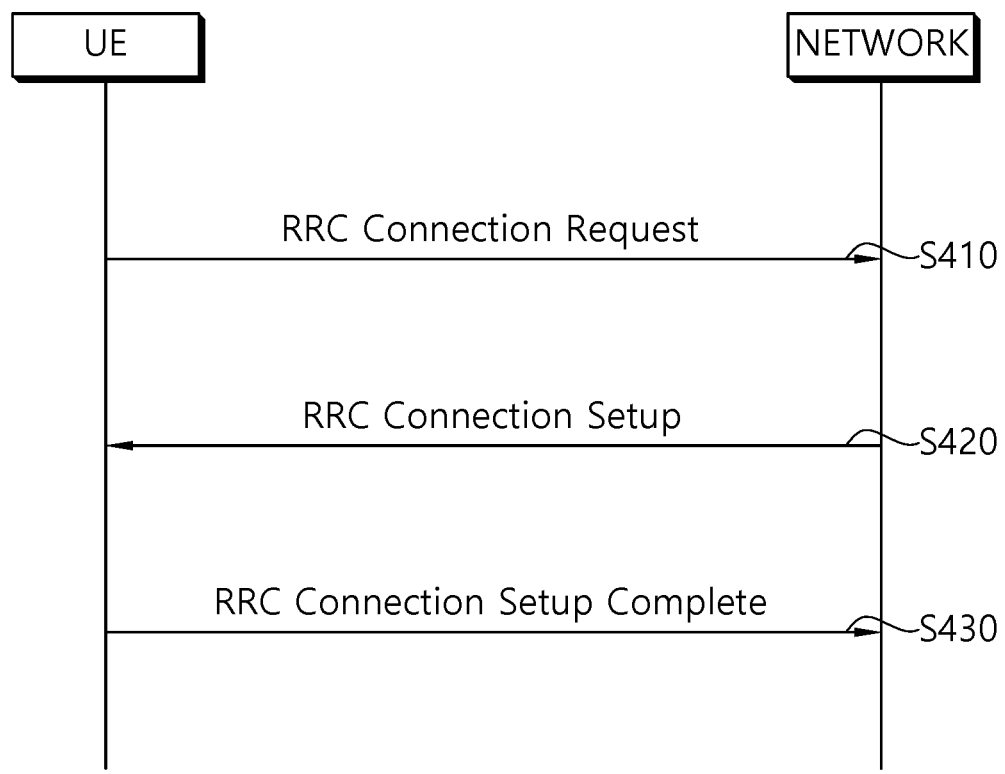
FIG. 4 shows an RRC connection establishment procedure.

FIG. 4 shows an RRC connection establishment procedure.

UE sends an RRC connection request message that requests RRC connection to a network (S410). The network sends an RRC connection establishment message as a response to the RRC connection request (S420). After receiving the RRC connection establishment message, the UE enters RRC connected mode.

The UE sends an RRC connection establishment complete message used to check the successful completion of the RRC connection to the network (S430).

Figure 5:
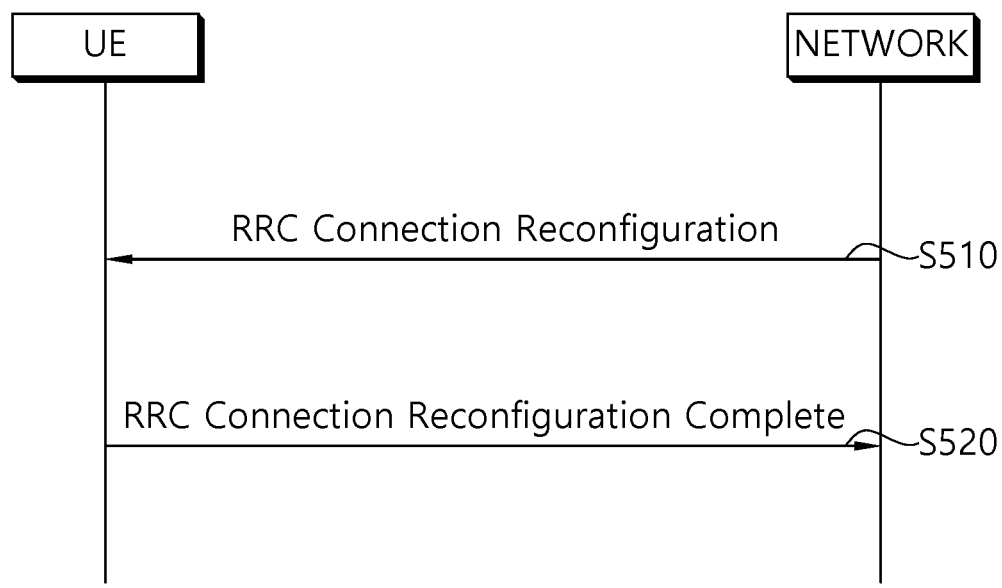
FIG. 5 shows an RRC connection reconfiguration procedure.

FIG. 5 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S510). As a response to the RRC connection reconfiguration message, the UE sends an RRC connection reconfiguration complete message used to check the successful completion of the RRC connection reconfiguration to the network (S520).

Figure 6:
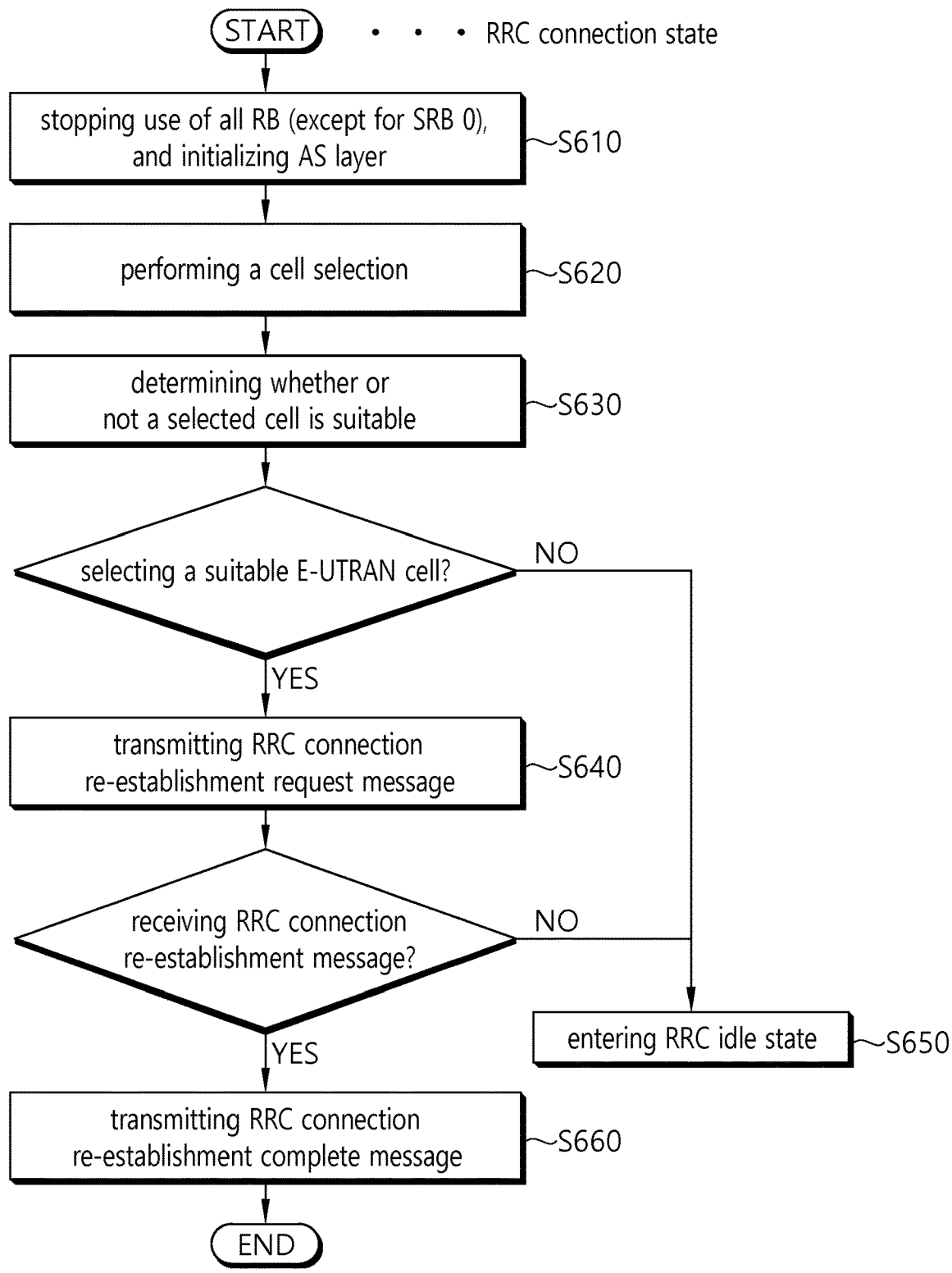
FIG. 6 shows an RRC connection re-establishment procedure.

FIG. 6 shows an RRC connection re-establishment procedure.

Referring to FIG. 6, UE stops using all the radio bearers that have been configured other than a Signaling Radio Bearer (SRB) #0, and initializes a variety of kinds of sublayers of an Access Stratum (AS) (S610). Furthermore, the UE configures each sublayer and the PHY layer as a default configuration. In this process, the UE maintains the RRC connection state.

The UE performs a cell selection procedure for performing an RRC connection reconfiguration procedure (S620). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S630). If the selected cell is determined to be a suitable E-UTRAN cell, the UE sends an RRC connection re-establishment request message to the corresponding cell (S640).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S650).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S660).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Generally speaking, reliability of an RRC connection is important. It is because if a connection failure occurs, both a UE and an eNB cannot use a data radio bearer (DRB), and thus data transmission is not possible.

In LTE, an RRC function supports recovery of an RRC connection by using RRC connection re-establishment procedure. When the RRC connection re-establishment procedure is triggered, the UE may perform cell selection and access to the selected cell. In addition, the UE may resume data transmissions after RRC connection reconfiguration. However, it may take a time until the RRC connection re-establishment procedure is complete, and data transmission may be impossible during that time. It is obvious that such an interruption time will surpass user plane latency and increase packet delay. Thus, a reliable RRC connection is significantly important to minimize the interruption time in a connection failure case.

In small cell enhancement of LTE, RRC diversity was considered as a potential solution for improving mobility robustness. With the RRC diversity, RLF could be prevented as long as the UE is able to maintain a connection with at least one cell. Accordingly, it is possible to avoid the RRC re-establishment procedure.

However, the RRC diversity was not specified in the LTE standard in the end. In fact, it is not so obvious to support the RRC diversity when a RRC connection is in a good condition. Moreover, there are any other means to improve reliability of RRC message delivery. In LTE, all RRC messages are transferred via an MCG. For example, all RRC messages are transferred via the MCG regardless of an SRB used in both downlink and uplink. This is also acceptable for LTE/NR interworking and standalone NR unless an RRC connection is jeopardized (e.g., a connection failure case). Therefore, a mechanism for improving reliability of an RRC connection may be needed only in the connection failure case. Hereinafter, a method in which a UE controls a signaling radio bearer (SRB), and an apparatus supporting the method are described according to an embodiment of the present invention.

Figure 7:
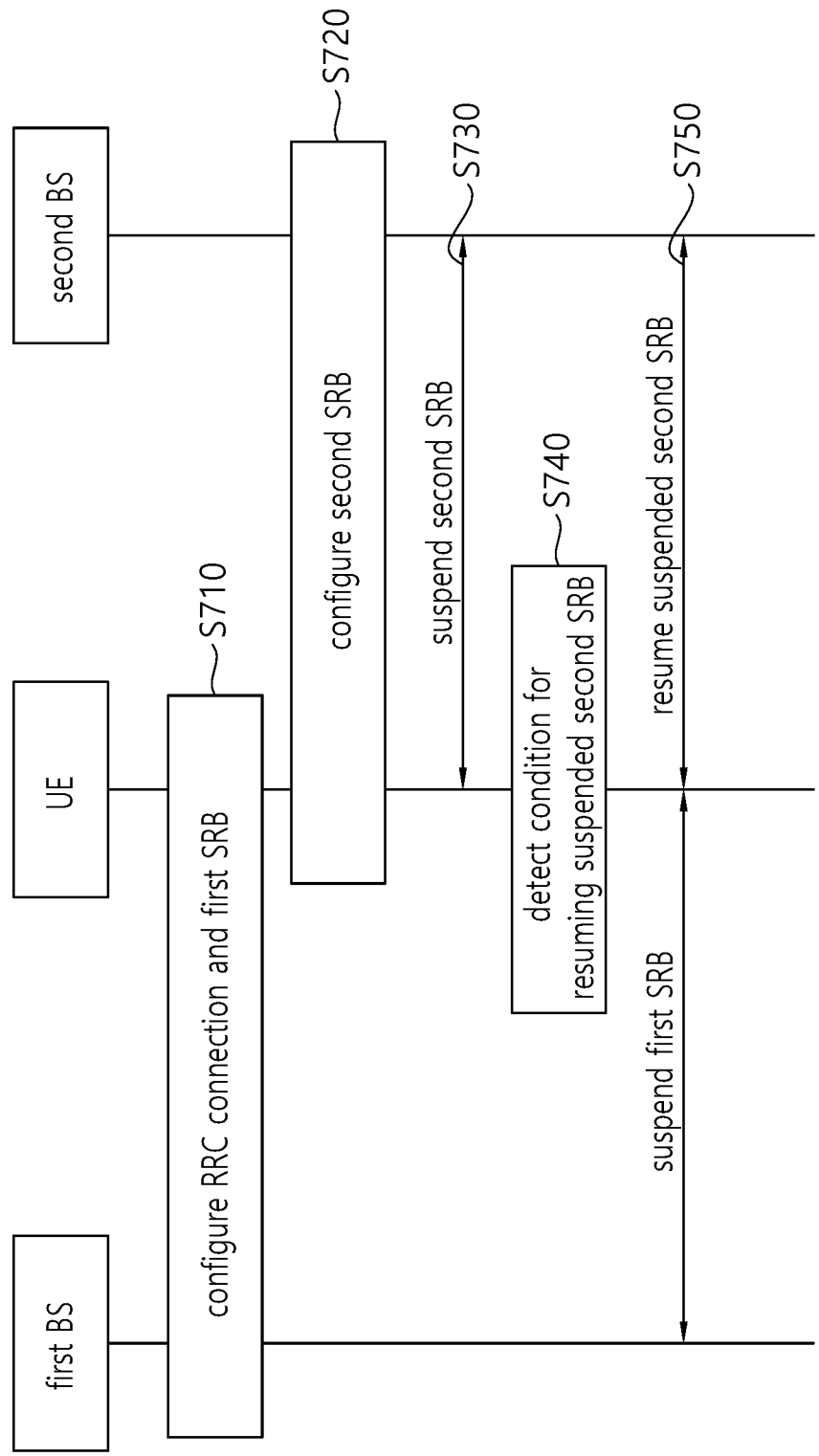
FIG. 7 shows a procedure in which a UE controls an SRB according to an embodiment of the present invention.

FIG. 7 shows a procedure in which a UE controls an SRB according to an embodiment of the present invention.

Referring to FIG. 7, in step S710, the UE may make an RRC connection with a first BS, and may set up a first SRB with the first BS. The first BS may be a master eNB or gNB. The first BS may be a BS where an RRC entity for the UE is located. The first SRB may provide exchange of an RRC message between an RRC entity of the first BS and an RRC entity of the UE. The number of the first SRBs may be at least one.

In step S720, the UE may configure a radio resource (and radio bearer) with the second BS, and may set up a second SRB with the second BS. The second BS may be a secondary eNB or gNB. The second BS may be a BS where an RRC entity for the UE is not located. The second BS may be connected to the first BS. The second SRB may provide exchange of an RRC message between an RRC entity of the first BS and an RRC entity of the UE. The number of the second SRBs may be at least one. The second SRB may be a temporary SRB.

In step S730, the second SRB may be suspended. Preferably, the second SRB may be suspended while the first SRB is not suspended.

In step S740, the UE may detect a condition for resuming the suspended second SRB. Alternatively, the UE may detect a condition for suspending the first SRB. The condition for resuming the suspended second SRB or the condition for suspending the first SRB is as follows.

Condition 1-1: Cell quality of a cell at the second BS is better than a threshold.
Condition 1-2: Cell quality of a cell at the first BS is worse than the threshold.
Condition 1-3: A timer related to a radio link failure starts.
Condition 1-4: A timer related to a handover failure starts.
Condition 1-5: An RRC connection re-establishment procedure for the UE is initiated.
Condition 1-6: The UE determines to suspend the first SRB. For example, the UE may determine to suspend the first SRB when transmission of data over the first SRB via the first BS becomes impossible.

In step S750, upon detection of at least one of the above conditions 1-1 to 1-6, the UE may resume the suspended second SRB. Further, the UE may suspend the first SRB.

Figure 8:
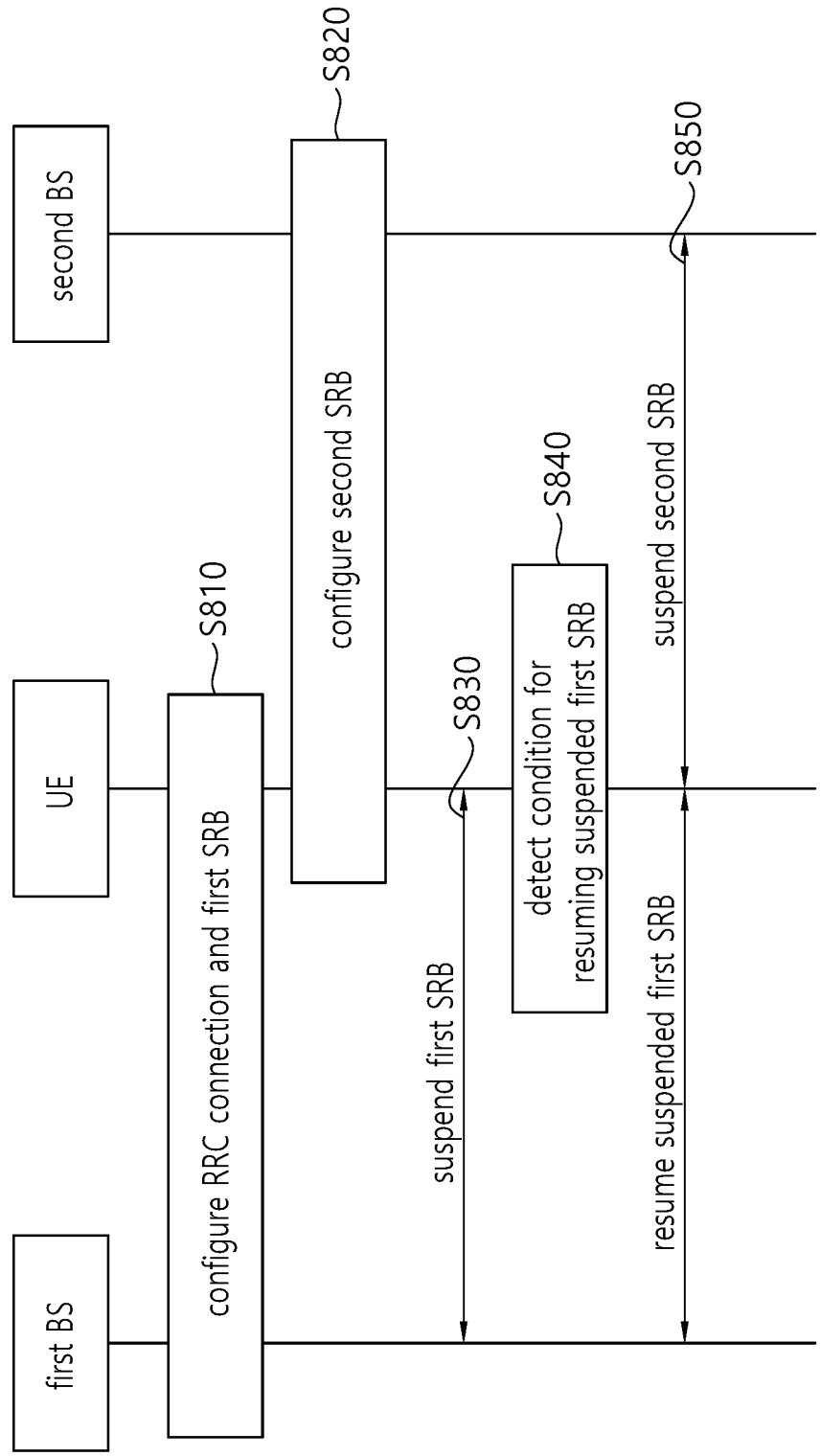
FIG. 8 shows a procedure in which a UE controls an SRB according to an embodiment of the present invention.

FIG. 8 shows a procedure in which a UE controls an SRB according to an embodiment of the present invention.

Referring to FIG. 8, in step S810, the UE may make an RRC connection with a first BS, and may set up a first SRB with the first BS. The first BS may be a master eNB or gNB. The first BS may be a BS where an RRC entity for the UE is located. The first SRB may provide exchange of an RRC message between an RRC entity of the first BS and an RRC entity of the UE. The number of the first SRBs may be at least one.

In step S820, the UE may configure a radio resource (and radio bearer) with the second BS, and may set up a second SRB with the second BS. The second BS may be a secondary eNB or gNB. The second BS may be a BS where an RRC entity for the UE is not located. The second BS may be connected to the first BS. The second SRB may provide exchange of an RRC message between an RRC entity of the first BS and an RRC entity of the UE. The number of the second SRBs may be at least one. The second SRB may be a temporary SRB.

In step S830, the first SRB may be suspended. Preferably, the first SRB may be suspended while the second SRB is not suspended.

In step S840, the UE may detect a condition for resuming the suspended first SRB. Alternatively, the UE may detect a condition for suspending the second SRB. The condition for resuming the suspended first SRB or the condition for suspending the second SRB is as follows.

- Condition 2-1: Cell quality of a cell at the first BS is better than a threshold.
- Condition 2-2: Cell quality of a cell at the second BS is worse than the threshold.
- Condition 2-3: A timer related to a radio link failure stops.
- Condition 2-4: A timer related to a handover failure stops.
- Condition 2-5: An RRC connection re-establishment procedure for the UE is successfully complete.
- Condition 2-6: The UE determines to suspend the second SRB. For example, the UE may determine to suspend the second SRB when transmission of data over the second SRB via the second BS becomes impossible.

In step S850, upon detection of at least one of the above conditions 2-1 to 2-6, the UE may resume the suspended first SRB. Further, the UE may suspend the second SRB.

Figure 9:
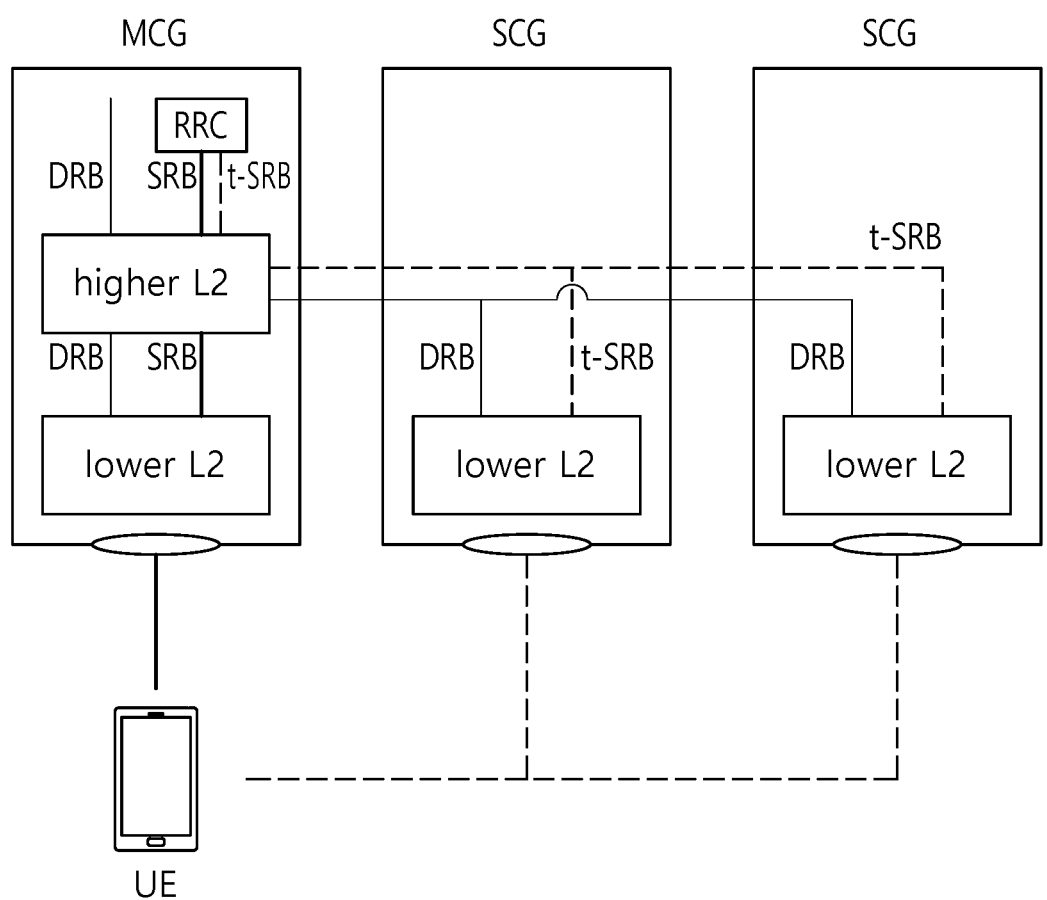
FIG. 9 shows an example in which a temporary SRB is configured according to an embodiment of the present invention.

FIG. 9 shows an example in which a temporary SRB is configured according to an embodiment of the present invention.

Referring to FIG. 9, the temporary SRB may be a signaling radio bearer (SRB) configured across an MCG and one or more SCGs. An RRC message created by RRC in the MCG may be temporarily carried over an SCG resource in a connection failure. For example, even in a case where the SRB cannot be used, a UE may receive an RRC message from an RRC entity of the MCG by using the temporary SRB.

Figure 10:
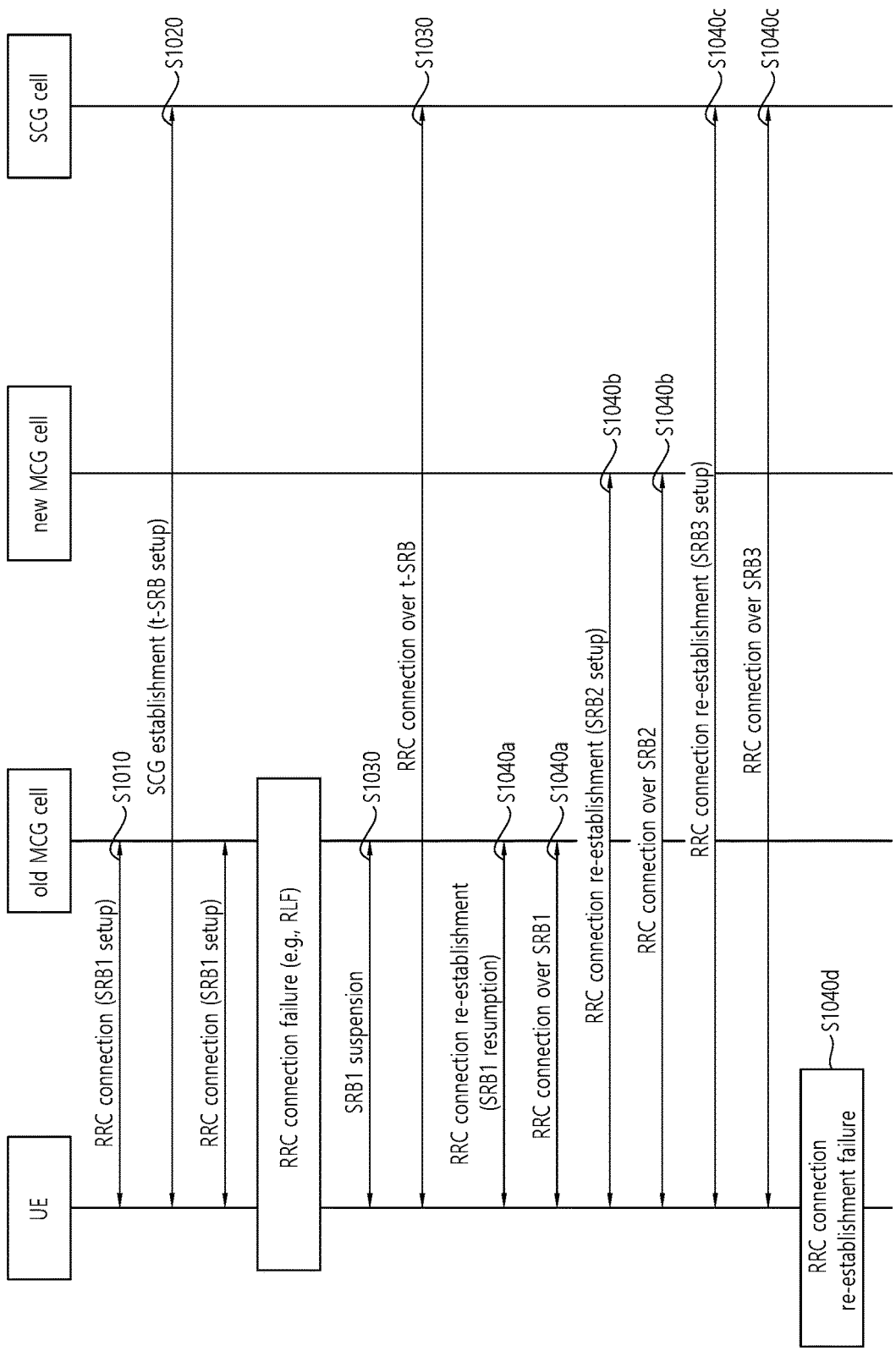
FIG. 10 shows a method in which an RRC connection is maintained through a temporary SRB in a connection failure and a procedure in which a UE performs RRC connection re-establishment according to an embodiment of the present invention.

FIG. 10 shows a method in which an RRC connection is maintained through a temporary SRB in a connection failure and a procedure in which a UE performs RRC connection re-establishment according to an embodiment of the present invention.

Referring to FIG. 10, in step S1010, a UE may establish an RRC connection with an old master cell group (MCG) cell. In addition, the UE may set up the old MCG cell and an SRB1. The SRB1 may be a normal SRB.

In step S1020, the UE which has set up the old MCG cell and the SRB1 in the RRC connection establishment procedure may perform SCG establishment. During the SCG establishment, the UE may set up a secondary cell group (SCG) cell and a temporary SRB. The temporary SRB may also be referred to as t-SRB. The t-SRB may be in a suspended state until a connection failure happens. The UE may not use the t-SRB when the RRC connection between the UE and the old MCG cell is in a good condition.

In step S1030, when an RRC connection between the UE and the old MCG cell is not in the good condition, the UE may start to use the t-SRB instead of the SRB1. In this case, the SRB1 may be suspended, and the RRC connection may be maintained through the t-SRB. For example, when RRC signaling through the SRB1 becomes impossible due to RLF, the UE may start to use the t-SRB instead of the SRB1. For example, when quality of the old MCG cell is worse than a threshold, the UE may start to use the t-SRB instead of the SRB1. For example, when quality of an SCG cell becomes better than the threshold, the UE may start to use the t-SRB instead of the SRB1. For example, when the quality of the old MCG cell becomes worse than the threshold and the quality of the SCG cell becomes better than the threshold, the UE may start to use the t-SRB instead of the SRB1. For example, when the handover fails, the UE may start to use the t-SRB instead of the SRB1. For example, when an RLF or HOF related timer (e.g., T310 or T311) starts, the UE may start to use the t-SRB instead of the SRB1. The t-SRB may be used to maintain the RRC connection even if the SRB1 is suspended in the RRC connection re-establishment procedure. Data transmission through DRB may be still ongoing on an SCG of a split bearer or an SCG bearer.

In parallel with maintaining the RRC connection of the MCG on the t-SRB through an SCG resource, the UE may still perform the RRC connection re-establishment procedure. For example, the RRC connection re-establishment procedure may conform to the legacy LTE procedure when the MCG is in E-UTRAN. Hereinafter, steps S1040a to S1040c may be selectively performed.

(1) When the UE performs the cell re-establishment with the old MCG cell

In step S1040a, when an RRC connection between the UE and the old MCG cell is in a good condition, the UE may suspend the t-SRB and resume the SRB1. For example, when the RRC connection re-establishment procedure for the old MCG cell is successfully complete, the UE may suspend the t-SRB and resume the SRB1. For example, when quality of the old MCG cell becomes better than a threshold, the UE may suspend the t-SRB and resume the SRB1. For example, when equality of an SCG cell becomes worse than the threshold, the UE may suspend the t-SRB and resume the SRB1. For example, when the quality of the old MCG cell becomes better than the threshold and the quality of the SCG cell becomes worse than the threshold, the UE may suspend the t-SRB and resume the SRB1. Therefore, after the RRC connection re-establishment in the old MCG cell, the UE may switch from the t-SRB to the SRB1 to maintain the RRC connection.

(2) When the UE performs cell re-establishment with the new MCG cell

Alternatively, in step S1040b, the UE may establish the RRC connection with the new MCG cell. In addition, the UE may set up the new MCG cell and an SRB2. The SRB2 may be a normal SRB. For example, when the RRC connection re-establishment procedure for the new MCG cell is successfully complete, the UE may suspend a t-SRB and set up the SRB2. For example, when quality of the new MCG cell becomes better than a threshold, the UE may suspend the t-SRB and set up the SRB2. For example, when quality of the SCG cell becomes worse than the threshold, the UE may suspend the t-SRB and set up the SRB2. For example, when the quality of the new MCG cell becomes better than the threshold and the quality of the SCG cell becomes worse than the threshold, the UE may suspend the t-SRB and set up the SRB2. Therefore, after the RRC connection re-establishment in the new MCG cell, the UE may switch from the t-SRB to the SRB2 to maintain the RRC connection.

(3) When the UE performs cell re-establishment with the old SCG cell

Alternatively, in step S1040c, the UE may establish the RRC connection with the SCG cell. In addition, the UE may set up the SCG cell and an SRB3. The SRB3 may be a normal SRB. That is, the UE may re-establish the RRC connection with the SCG cell. In this case, when the RRC connection re-establishment procedure for the SCG cell is successfully complete, the SCG cell may be changed to the MCG cell. For example, when the RRC connection re-establishment procedure for the SCG cell is successfully complete, the UE may suspend the t-SRB and set up the SRB3. In this case, the UE which has set up the SRB3 with the SCG cell in the RRC connection establishment procedure may perform SCG establishment with a different SCG cell, and may set up the t-SRB with the different SCG cell during the SCG establishment.

(4) When the UE fails in cell re-establishment

Otherwise, in step S1040d, the RRC connection re-establishment procedure may not be successfully complete. If the RRC connection re-establishment procedure is not successfully complete, the UE may perform at least any one of the following options.

Option 1: The UE enters an RRC_IDLE state. In this case, all RBs including a t-SRB may be released.

Option 2: The UE enters a new RRC state. The new RRC state may be in the new RRC state neither in an RRC_IDLE state nor in an RRC_CONNECTED state. After the UE enters the new RRC state, the UE may select a cell in the new RRC state. For example, the new RRC state may be in a state where the UE is capable of performing the cell re-selection procedure and is capable of maintaining an ECM_CONNECTED state. For example, the new RRC state may be an RRC_INACTIVE state.

Option 3: The UE may perform a handover to a cell according to the following steps. In step 1, the UE may optionally transmit an RRC message requesting the handover to an RRC entity of MCG through the t-SRB. In step 2, the RRC entity of the MCG may transmit a handover command message towards a target cell to the UE through the t-SRB. In step 3, the UE may move to the target cell and transmit a handover complete message to the cell. The cell may be configured as PCell in MCG.

According to an embodiment of the present invention, the UE can still receive the RRC message by using the second SRB when it is impossible to use the first SRB, thereby improving reliability of RRC message delivery.

Figure 11:
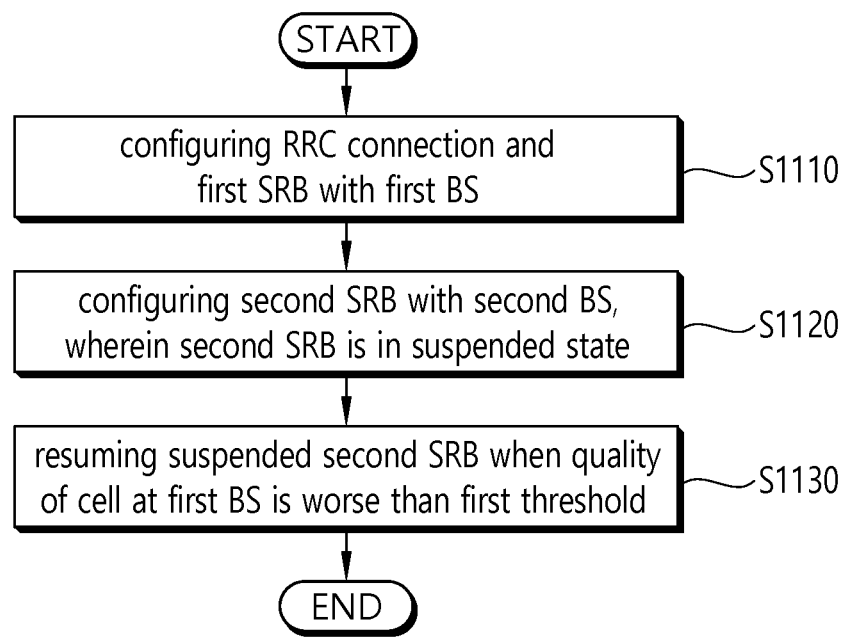
FIG. 11 is a block diagram showing a method in which a UE controls an SRB according to an embodiment of the present invention.

FIG. 11 is a block diagram showing a method in which a UE controls an SRB according to an embodiment of the present invention.

Referring to FIG. 11, in step S1110, the UE may configure a radio resource control (RRC) connection and a first SRB with a first BS. The first BS may be a BS where an RRC entity for the UE is located.

In step S1120, the UE may configure a second SRB with a second BS. The second SRB may be in a suspended state. The second SRB may be a t-SRB. The second BS may be a BS where an RRC entity for the UE is not located.

In step S1130, when quality of a cell at the first BS is worse than a first threshold, the UE may resume the suspended second SRB.

In addition, the UE may suspend the first SRB.

In addition, when quality of a cell at the second BS is better than a second threshold, the UE may resume the suspended second SRB.

In addition, the UE may resume the suspended second SRB when a timer related to a radio link failure or a handover failure starts.

In addition, the UE may resume the suspended second SRB when an RRC connection re-establishment is initiated.

In addition, the UE may resume the suspended second SRB when the terminal determines to suspend the first SRB.

Figure 12:
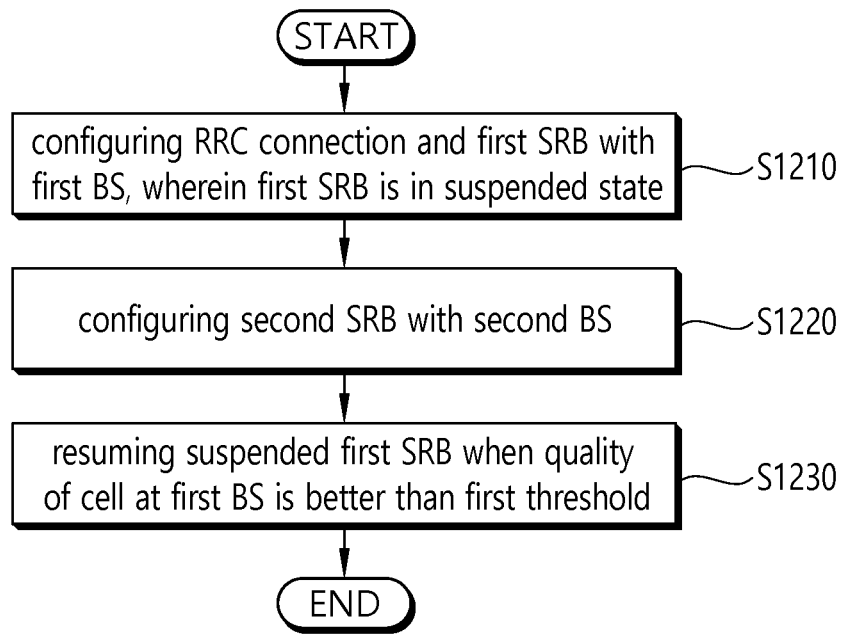
FIG. 12 is a block diagram showing a method in which a UE controls an SRB according to an embodiment of the present invention.

FIG. 12 is a block diagram showing a method in which a UE controls an SRB according to an embodiment of the present invention.

Referring to FIG. 12, in step S1210, the UE may configure a radio resource control (RRC) connection and a first SRB with a first BS. The first SRB may be in a suspended state. The first BS may be a BS where an RRC entity for the UE is located.

In step S1220, the UE may configure a second SRB with a second BS. The second SRB may be a t-SRB. The second BS may be a BS where an RRC entity for the UE is not located.

In step S1230, when quality of a cell at the first BS is better than a first threshold, the UE may resume the suspended first SRB.

In addition, the UE may suspend the second SRB.

In addition, when quality of a cell at the second BS is worse than a second threshold, the UE may resume the suspended first SRB.

In addition, the UE may resume the suspended first SRB when a timer related to a radio link failure or a handover failure stops.

In addition, the UE may resume the suspended first SRB when the terminal determines to suspend the second SRB.

In addition, upon completion of the re-establishment procedure for the RRC connection, the UE may resume the suspended first SRB.

Figure 13:
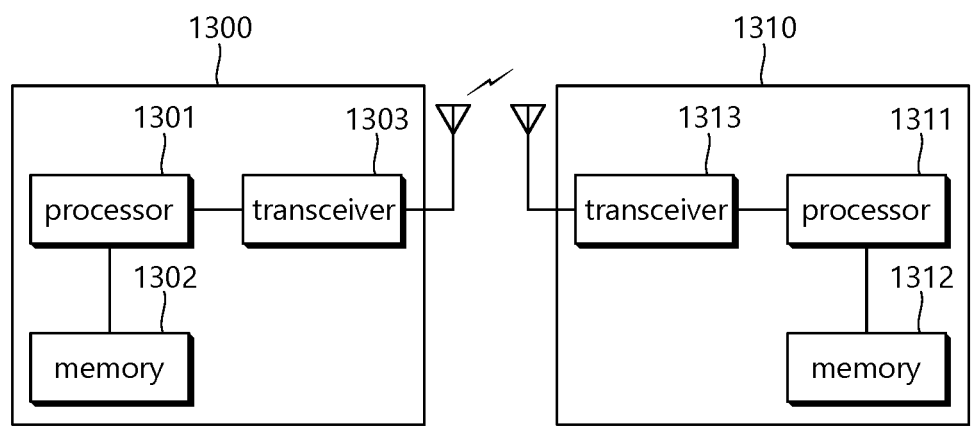
FIG. 13 is a block diagram illustrating a wireless communication system according to the embodiment of the present invention.

FIG. 13 is a block diagram illustrating a wireless communication system according to the embodiment of the present invention.

ABS 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the base station may be implemented by the processor 1301.

A UE 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the base station may be implemented by the processor 1311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method in which a terminal controls a signaling radio bearer (SRB) in a wireless communication system, the method comprising:
    configuring a radio resource control (RRC) connection and a first SRB with a first base station;
    configuring a second SRB in a suspended state with a second base station,
    wherein the second SRB is in the suspended state before a quality of a cell at the first base station is worse than a first threshold;
    suspending the first SRB based on the quality of the cell at the first base station which is worse than the first threshold;
    resuming the suspended second SRB based on the quality of the cell at the first base station which is worse than the first threshold and the first SRB which is suspended,
    wherein the second SRB is a temporary SRB for exchanging an RRC message between an RRC entity of the terminal and an RRC entity of the first base station based on a secondary cell group (SCG) resource, after the second SRB is resumed and before the suspended first SRB is resumed,
    wherein the SCG resource is related to the second base station, and
    wherein the first base station is a base station where the RRC entity for the terminal is located, and the second base station is a base station where the RRC entity for the terminal is not located;
    performing a RRC connection re-establishment procedure for the first base station, based on the first SRB which is suspended; and
    based on an unsuccessful completion of the RRC connection re-establishment procedure: i) transmitting a handover request to the RRC entity of the first base station based on the temporary SRB; ii) receiving a handover command from the RRC entity of the first base station based on the temporary SRB; iii) moving to a cell related to the first base station; and iv) transmitting a handover complete message to the cell.

2. The method of claim 1, wherein the suspended second SRB is resumed based on a quality of a cell at the second base station which is better than a second threshold.

3. The method of claim 1, wherein the suspended second SRB is resumed based on starting of a timer related to a radio link failure or a handover failure.

4. The method of claim 1, further comprising resuming the suspended second SRB when an RRC connection re-establishment is initiated.

5. The method of claim 1, further comprising resuming the suspended second SRB when the terminal determines to suspend the first SRB.

6. The method of claim 1, further comprising:
    selecting a cell where the terminal performs a cell re-selection procedure, based on the unsuccessful completion of the RRC connection re-establishment procedure,
    wherein an evolved-packet-core connection management (ECM) connected state of the terminal is maintained.

7. A method in which a terminal controls a signaling radio bearer (SRB) in a wireless communication system, the method comprising:
    configuring a radio resource control (RRC) connection and a first SRB in a suspended state with a first base station,
    wherein the first SRB is in the suspended state before a quality of a cell at the first base station is better than a first threshold;
    configuring a second SRB with a second base station;
    suspending the second SRB based on the quality of the cell at the first base station which is better than the first threshold;
    resuming the suspended first SRB based on the quality of the cell at the first base station which is better than the first threshold and the first SRB which is suspended,
    wherein the second SRB is a temporary SRB for exchanging an RRC message between an RRC entity of the terminal and an RRC entity of the first base station based on a secondary cell group (SCG) resource, before the suspended first SRB is resumed,
    wherein the SCG resource is related to the second base station, and
    wherein the first base station is a base station where the RRC entity for the terminal is located, and the second base station is a base station where the RRC entity for the terminal is not located;
    performing a RRC connection re-establishment procedure for the first base station based on the first SRB which is suspended; and
    based on an unsuccessful completion of the RRC connection re-establishment procedure:
    i) transmitting a handover request to the RRC entity of the first base station based on the temporary SRB; ii) receiving a handover command from the RRC entity of the first base station based on the temporary SRB; iii) moving to a cell related to the first base station; and iv) transmitting a handover complete message to the cell.

8. The method of claim 7, wherein the suspended first SRB is resumed based on a quality of a cell at the second base station which is worse than a second threshold.

9. The method of claim 7, wherein the suspended first SRB is resumed based on stopping of a timer related to a radio link failure or a handover failure.

10. The method of claim 7, wherein the suspended first SRB is resumed based on the terminal which determines to suspend the second SRB.

11. A terminal for controlling a signaling radio bearer (SRB) in a wireless communication system, the terminal comprising:
- a memory;
- a transceiver; and
- a processor operatively coupling the memory and the transceiver, wherein the processor is configured to:
- configure a radio resource control (RRC) connection and a first SRB with a first base station;
- configure a second SRB in a suspended state with a second base station,
- wherein the second SRB is in a suspended state before a quality of a cell at the first base station is worse than a first threshold;
- suspend the first SRB based on the quality of the cell at the first base station which is worse than the first threshold;
- resume the suspended second SRB based on the quality of the cell at the first base station is worse than the first threshold and the first SRB which is suspended,
- wherein the second SRB is a temporary SRB for exchanging an RRC message between an RRC entity of the terminal and an RRC entity of the first base station based on a secondary cell group (SCG) resource, after the second SRB is resumed and before the suspended first SRB is resumed,
- wherein the SCG resource is related to the second base station, and
- wherein the first base station is a base station where the RRC entity for the terminal is located, and the second base station is a base station where the RRC entity for the terminal is not located;
- perform a RRC connection re-establishment procedure for the first base station, based on the first SRB which is suspended; and
- based on an unsuccessful completion of the RRC connection re-establishment procedure:
- i) transmit a handover request to the RRC entity of the first base station based on the temporary SRB; ii) receive a handover command from the RRC entity of the first base station based on the temporary SRB; iii) move to a cell related to the first base station; and iv) transmit a handover complete message to the cell.

* * * * *